United States Patent
Kishino et al.

(10) Patent No.: US 8,995,035 B2
(45) Date of Patent: Mar. 31, 2015

(54) IMAGE PROCESSING METHOD AND APPARATUS, AND COLOR SEPARATION TABLE GENERATING METHOD OPTIMIZING COLOR GAMUT FOR EACH PRINTING MODE

(71) Applicant: Canon Kabushiki Kaisha, Tokyo (JP)

(72) Inventors: Mayuko Kishino, Tokyo (JP); Shinichi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/794,326

(22) Filed: Mar. 11, 2013

(65) Prior Publication Data

US 2013/0250320 A1    Sep. 26, 2013

(30) Foreign Application Priority Data

Mar. 22, 2012   (JP) .................................. 2012-065660

(51) Int. Cl.
*H04N 1/60*      (2006.01)
*G06K 15/02*     (2006.01)

(52) U.S. Cl.
CPC .............. *G06K 15/1878* (2013.01); *H04N 1/60* (2013.01)

USPC .......... 358/518; 358/523; 358/3.24; 358/1.13

(58) Field of Classification Search
None
See application file for complete search history.

(56) References Cited

U.S. PATENT DOCUMENTS 7,068,380 B2 *   6/2006   Milton et al. ................. 358/1.13
7,965,426 B2 *   6/2011   Hori et al. ..................... 358/518

FOREIGN PATENT DOCUMENTS

JP        9-186898 A      7/1997

* cited by examiner

*Primary Examiner* — Scott A Rogers
(74) *Attorney, Agent, or Firm* — Canon USA Inc IP Division

(57) ABSTRACT

A color gamut for each printing mode is maximally used, a color separation table is used, which includes an area (color reproduction maintaining area) for which an image having a color difference of a predetermined value or less between printing modes in a case where the same input value is input is output and an area (area other than the color reproduction maintaining area) for which an image having a color difference of a predetermined value or more between the printing modes in a case where the same input value is input is output. From this, a color matching table can be shared between the printing modes.

23 Claims, 15 Drawing Sheets

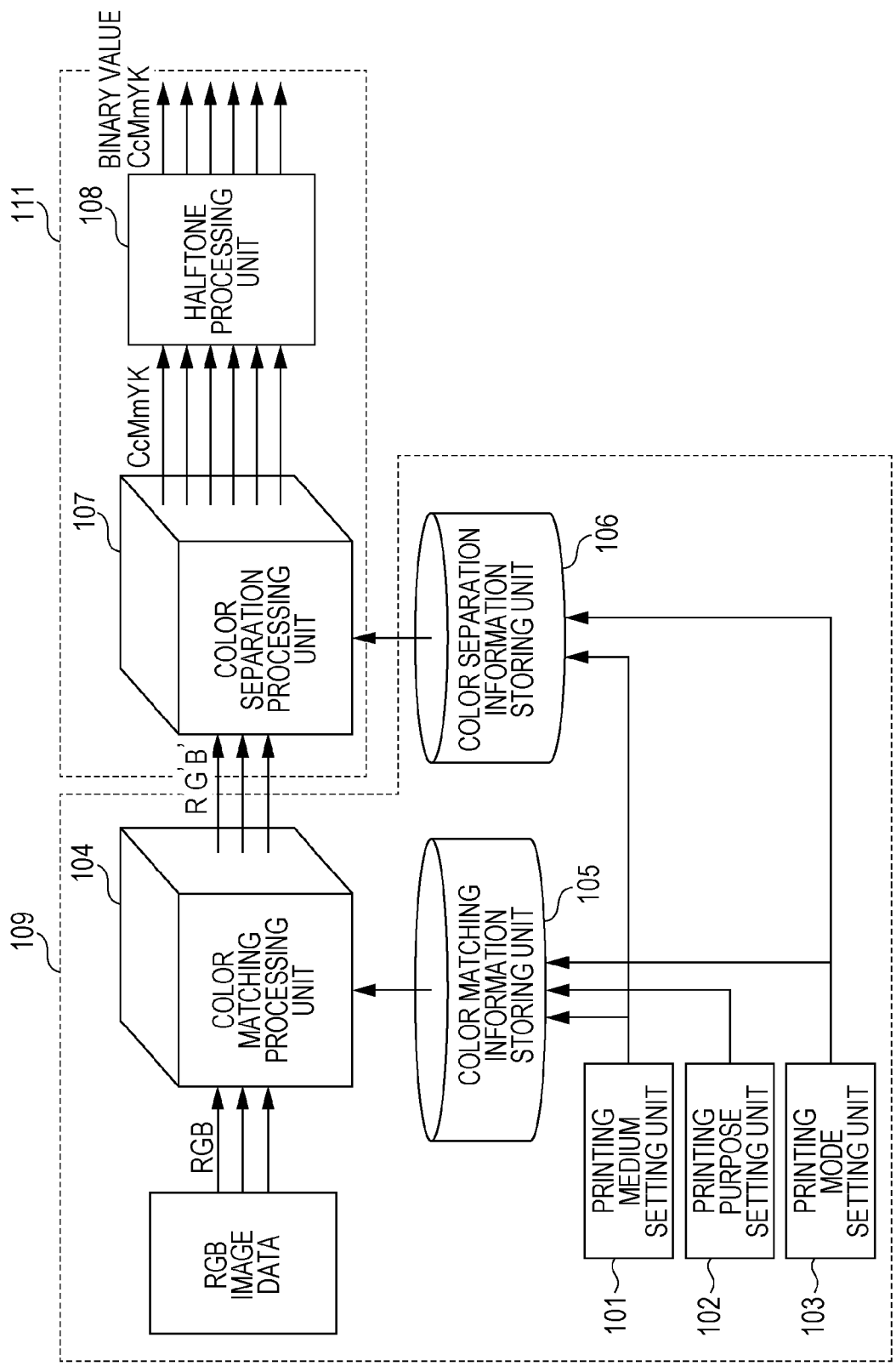

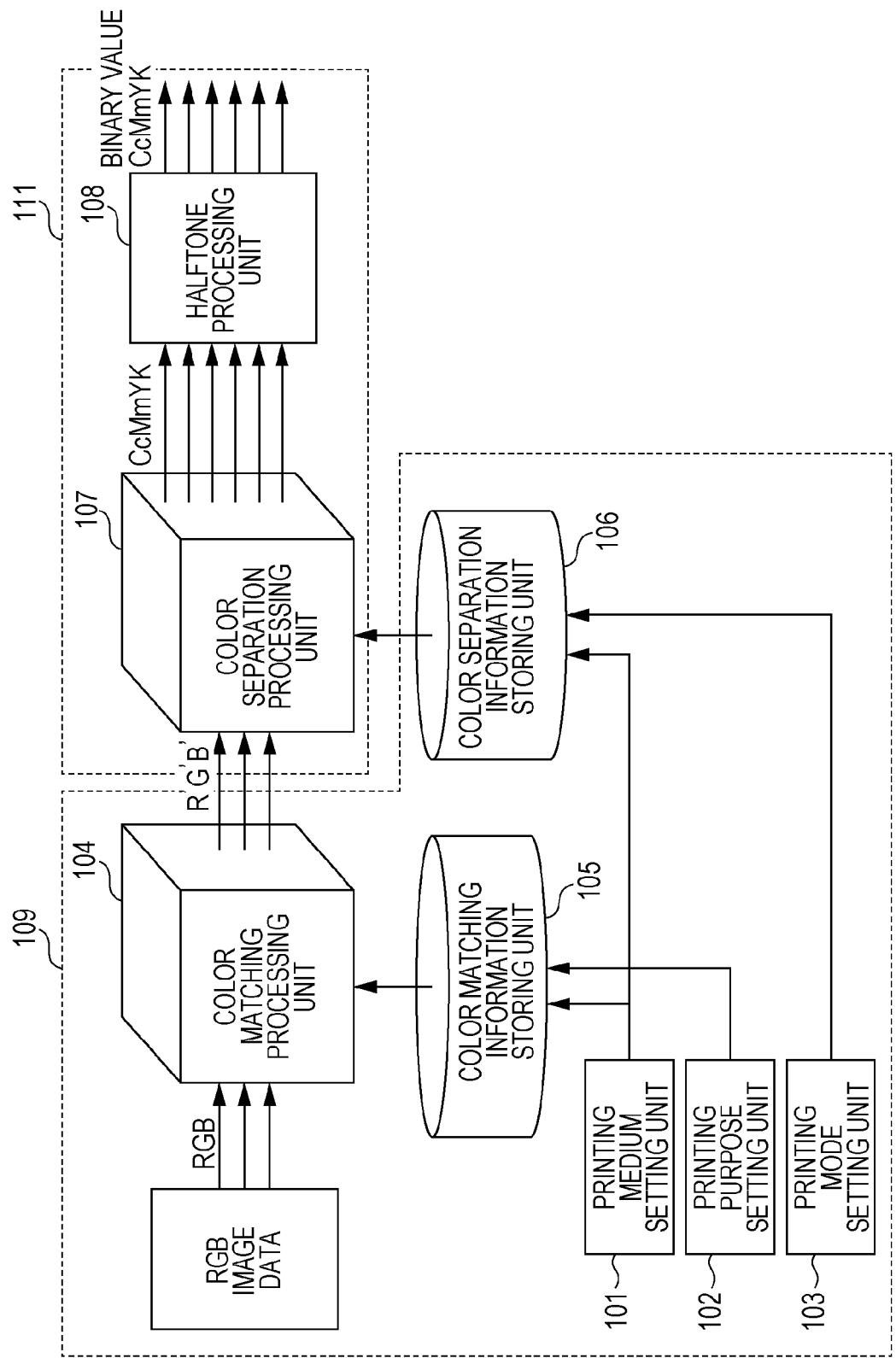

FIG. 8A
FIG. 8B
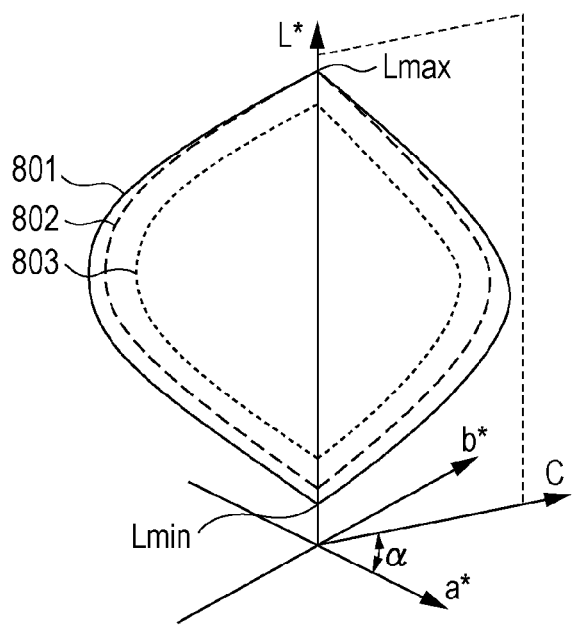
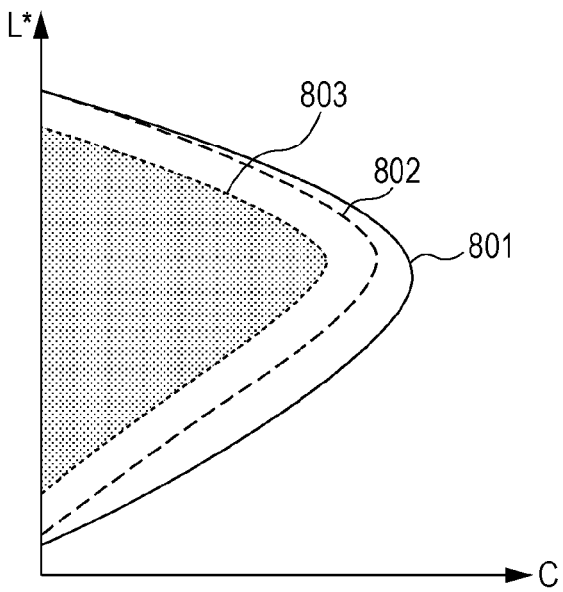

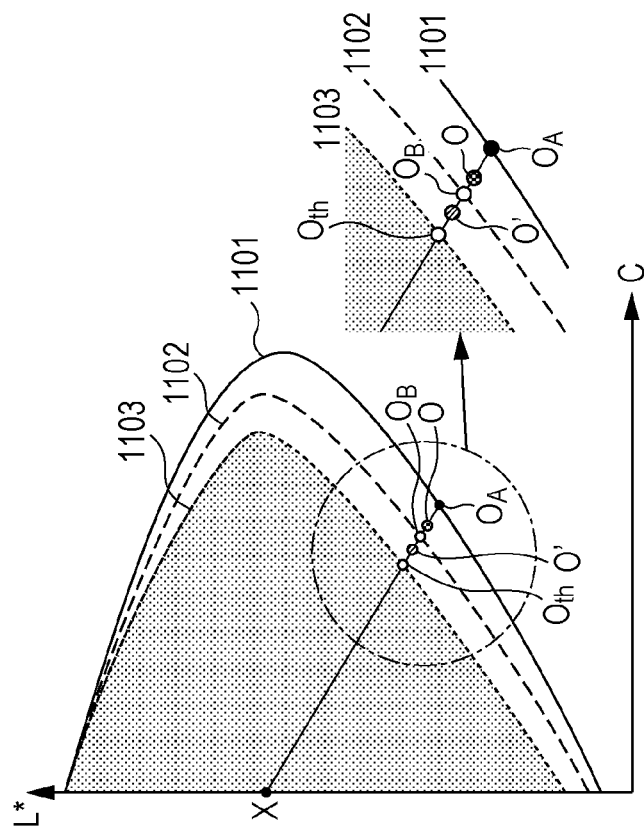
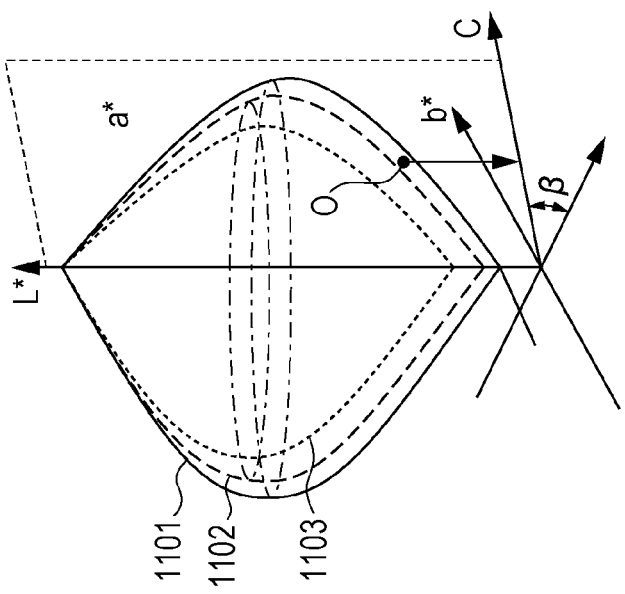
FIG. 11A
FIG. 11B

PRINTING MODE A COLOR SEPARATION TABLE

PRINTING MODE B COLOR SEPARATION TABLE

PRINTING MODE A COLOR SEPARATION TABLE

PRINTING MODE B COLOR SEPARATION TABLE

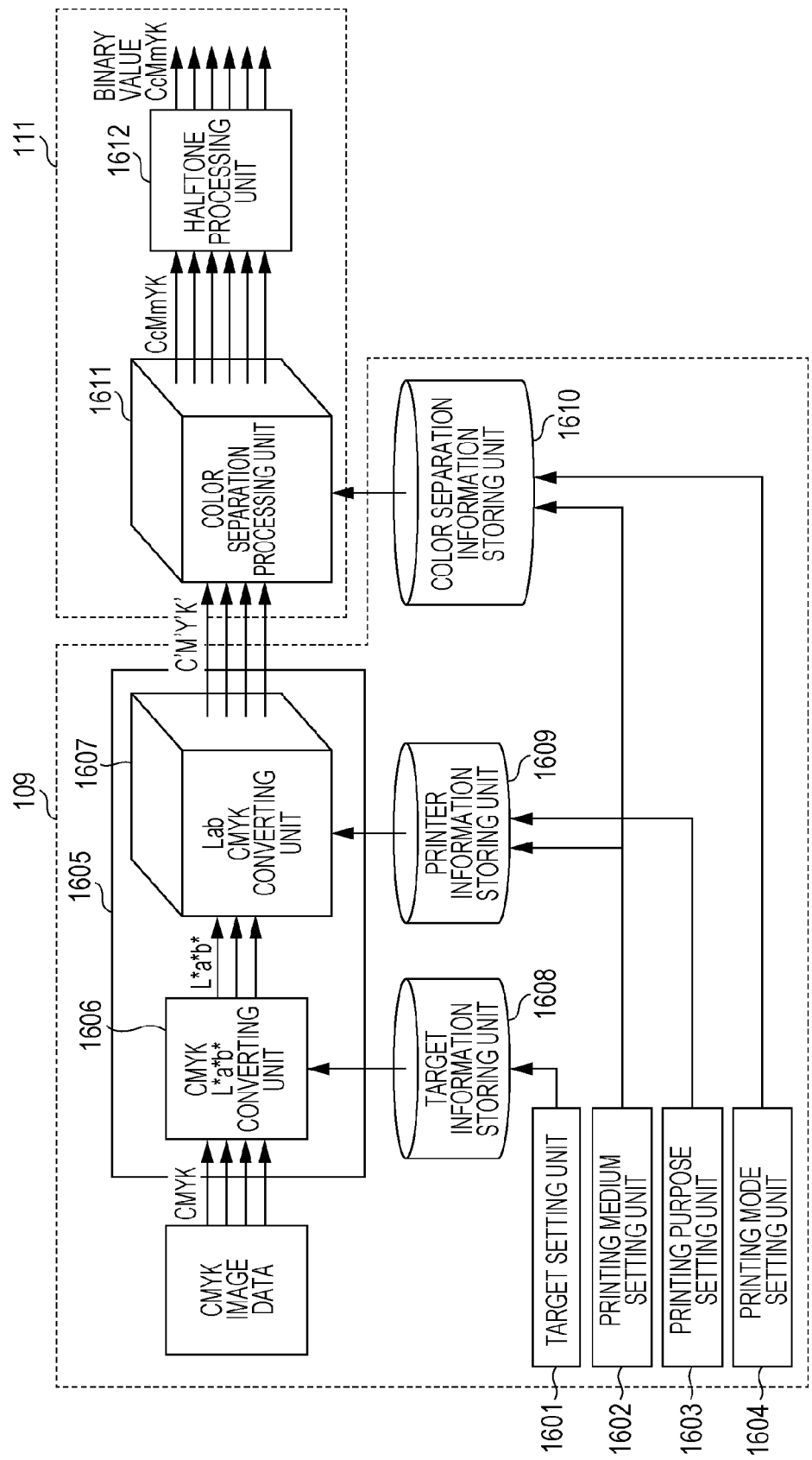

IMAGE PROCESSING METHOD AND APPARATUS, AND COLOR SEPARATION TABLE GENERATING METHOD OPTIMIZING COLOR GAMUT FOR EACH PRINTING MODE

BACKGROUND OF THE INVENTION

1. Field of the Invention

The present invention relates to an image processing method, an image processing apparatus, and a generating method for printing an image on a printing medium by executing one of a plurality of printing modes.

2. Description of the Related Art

Recently, printing apparatuses (printing apparatuses) represented by ink jet printers are requested to cope with a plurality of types of printing media. As printing materials, ink of light cyan (PC), ink of light magenta (PM), ink of gray (Gy), and the like are used in addition to ink of cyan (C), magenta (M), yellow (Y), and black (K). In addition, a printing system is known in which ink of red (R), green (G), blue (B), and the like is added so as to enlarge a color gamut. Such a color printing apparatus is connected to a personal computer (PC). Then, by processing printing data produced by the PC using a printer driver or a raster image processor (RIP) software solution, the printing data is printed on a printing medium such as paper. In image processing performed in a printing system using a PC and a printing apparatus, generally, after a color adjusting process, a color matching (color correction) process, a color separation process, and a halftoning process are performed, ink is ejected onto a printing medium, whereby an image is printed. Image data output from the PC to the printing apparatus is image data of an RGB signal in a case where a printer driver is used, and is image data of a CMYK signal in a case where a RIP software solution is used.

In such a printing system, color separation information that is appropriate for each printing medium is prepared in the color separation process. In addition, in the color matching process, color matching information is prepared for each printing purpose (for example, "photograph-like", "vividness preference", "color difference preference", and the like). Such information is used while being stored and managed as a color parameter of a maker-specific format and in an ICC color profile format.

In addition, in a printing system using an ink jet printer, a plurality of printing modes according to the purposes is prepared. A printing mode is a printing condition according to the purpose of printing an image, and, by executing such a printing mode, an image is printed on a printing medium. For example, as printing modes, there are an image quality priority mode in which a high-quality image is printed, a speed preference mode in which printing is performed at high speed, and the like. Generally, "fine" that is the image quality priority mode, "fast" that is the speed preference mode, "standard" that is an intermediate mode therebetween, and the like can be selected in a stepped manner and can be set in an UI display. Here, the image quality priority mode is realized by controlling printing conditions for, compared to the standard mode, setting the printing resolution to relatively high resolution (1200×2400 dpi), increasing the number of scans in multi-pass printing, decreasing the carriage speed of a printing head ejecting ink, and the like. On the other hand, the speed preference mode is realized by controlling printing conditions for, compared to the standard mode, setting the printing resolution to relatively low resolution (1200×1200 dpi), decreasing the number of scans in multi-pass printing, increasing the carriage speed of the printing head, and the like.

When the printing conditions are set as described above, a reproducible color gamut is determined in accordance with each printing medium. For example, in the image quality priority mode, a maximum value (hereinafter, referred to as a maximum ink applying amount) of the amount of ink applied to a unit area of a printing medium is larger than that in the speed preference mode, and accordingly, it is possible to reproduce a color gamut broader than that of the speed preference mode. In Japanese Patent Application Laid-Open No. 9-186898, it is disclosed that a color separation table corresponding to each printing mode is generated in consideration of the output characters of each printing mode such that the reproducible color gamut can be maximally used. However, in a case where a color separation table that is optimal for each printing mode is generated as in Japanese Patent Application Laid-Open No. 9-186898, there is a case where images of mutually different colors are printed in accordance with printing modes even for the same input image signal.

FIG. 13A illustrates a color separation table corresponding to a printing mode A having a relatively broad color gamut and a color separation table corresponding to a printing mode B having a relatively narrow color gamut. FIG. 13B illustrates the color gamuts of the printing modes A and B. In a case where images are printed by inputting the same image signals (RGB values) to such color separation tables and separating the image signals for each color, a color reproduction value (L*a*b* value) of the image printed in the printing mode A is a point 121, and a color reproduction value of the image printed in the printing mode B is a point 122. In other words, in order to print images of the same color for the same input image signals regardless of the printing modes, a color matching table corresponding to each color separation table needs to be prepared.

In addition, the color separation tables need to be different also in accordance with the printing purposes such as "photograph-like", "vividness preference", and "color difference preference" and the type of printing medium. Accordingly, in a printing system in which the printing purpose and the printing medium can be selected from among a plurality of printing purposes and a plurality of printing media, color separation tables that is color separation information corresponding to the numbers thereof need to be prepared. For example, in a printing system corresponding to three types of printing modes, three types of printing purposes, and three types of printing media, color separation tables of 3×3×3=27 types are necessary. In addition, a color matching table corresponding to each color separation table needs to be prepared.

The preparation of color matching tables corresponding to the number of the types of printing media, printing modes, and printing purposes as described above leads not only to an increase in the number of design processes and capacity enlargement of a memory storing such information but also to a high processing load at the time of printing an image. Further in a case where a user generates a profile that is a color matching table, the profile needs to be generated for each printing mode, whereby the load is high. At this time, an ICC profile that is color matching information needs to be designated for each printing mode, and thus, there is a problem in that the convenience at the time of printing an image is degraded.

An embodiment of the present invention is in view of such problems and provides an image processing method and an image processing apparatus capable of lowering the processing load and suppressing capacity enlargement of the memory while utilizing the color gamut for each printing mode to a maximum extent.

SUMMARY OF THE INVENTION

In order to solve the above-described problems, according to an aspect of the present invention, there is provided an image processing method for a printing apparatus that prints an image by executing one of a plurality of printing modes, the image processing method including: a color correcting step of performing color correction of an input image signal to an image signal represented in a first color gamut by using a color profile; and a color separating step of performing color separation of the image signal color-corrected in the color correcting step into an image signal represented in a second color gamut different from the first color gamut by using a color separation table corresponding to a printing mode executed by the printing apparatus out of a plurality of color separation tables including a first color separation table corresponding to a first printing mode and a second color separation table corresponding to a second printing mode, wherein a difference between a first measured value and a second measured value is less than a predetermined value, the first measured value being acquired by measuring an image printed by executing the first printing mode using the printing apparatus based on a second image signal acquired by performing color separation of a first image signal color-corrected in the color correcting step using the first color separation table, the second measured value being acquired by measuring an image printed by executing the second printing mode using the printing apparatus based on a third image signal acquired by performing color separation of the first image signal using the second color separation table, and wherein a difference between a third measured value and a fourth measured value is the predetermined value or more, the third measured value being acquired by measuring an image printed by executing the first printing mode using the printing apparatus based on a fifth image signal acquired by performing color separation of a fourth image signal color-corrected in the color correcting step using the first color separation table, the fourth measured value being acquired by measuring an image printed by executing the second printing mode using the printing apparatus based on a sixth image signal acquired by performing color separation of the fourth image signal using the second color separation table.

According to an embodiment of the present invention, a color matching tables can be used to be common to printing modes without preparing a color matching table corresponding to each printing mode. From this, there are advantages that the number of design processes relating to the generation of the color matching table decreases, and the required memory capacity of a storage medium decreases in accordance with a decrease in the number of pieces of color matching process information.

Further features of the present invention will become apparent from the following description of exemplary embodiments (with reference to the attached drawings).

BRIEF DESCRIPTION OF THE DRAWINGS

FIGS. 1A and 1B are schematic block diagrams that illustrate the configuration of image processing units of color printing apparatus systems;

FIGS. 8A and 8B are diagrams that illustrate a method of setting a maintaining area according to a second embodiment;

FIGS. 11A and 11B are diagrams that illustrate a method of determining lattice points of a color separation table;

FIG. 15 is a schematic block diagram that illustrates the configuration of an image processing unit of a color printing apparatus system according to an embodiment of the present invention.

DESCRIPTION OF THE EMBODIMENTS

First Embodiment

Figure 2:
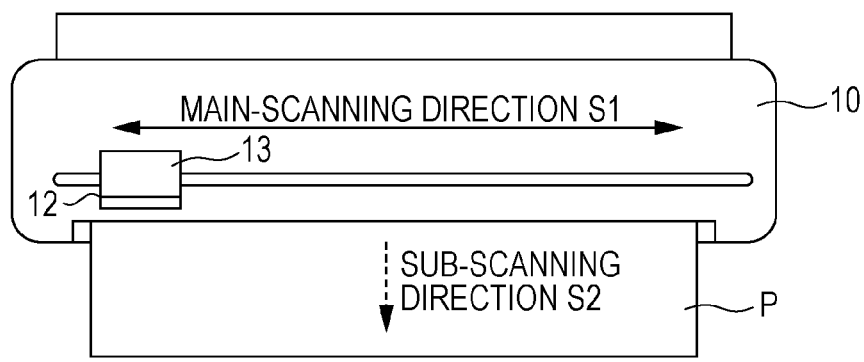
FIG. 2 is a schematic diagram of a color printing apparatus according to an embodiment of the present invention.

FIG. 2 is a schematic perspective view that illustrates the configuration of a serial-type ink jet printing apparatus used in this embodiment. A printing head 12 is mounted on a carriage 13 that moves at a constant speed in the main-scanning direction S1 and ejects ink based on ejection data at a frequency corresponding to the constant speed. When one scan is completed, a conveying roller and an auxiliary roller rotate, and a printing medium P that is interposed between such rollers and a feed roller and the auxiliary roller is conveyed in a sub-scanning direction S2 intersecting with a main-scanning direction S1 by an amount corresponding to the printing width of a printing head 12. By alternately repeating the scanning of the printing head and the printing medium conveying operation, an image is printed on the printing medium P in a stepped manner. In the printing head 12, an ejection substrate corresponding to each ink color is arranged in the main-scanning direction, and, in each ejection substrate, a plurality of nozzles are arranged in the sub-scanning direction.

Figure 4:
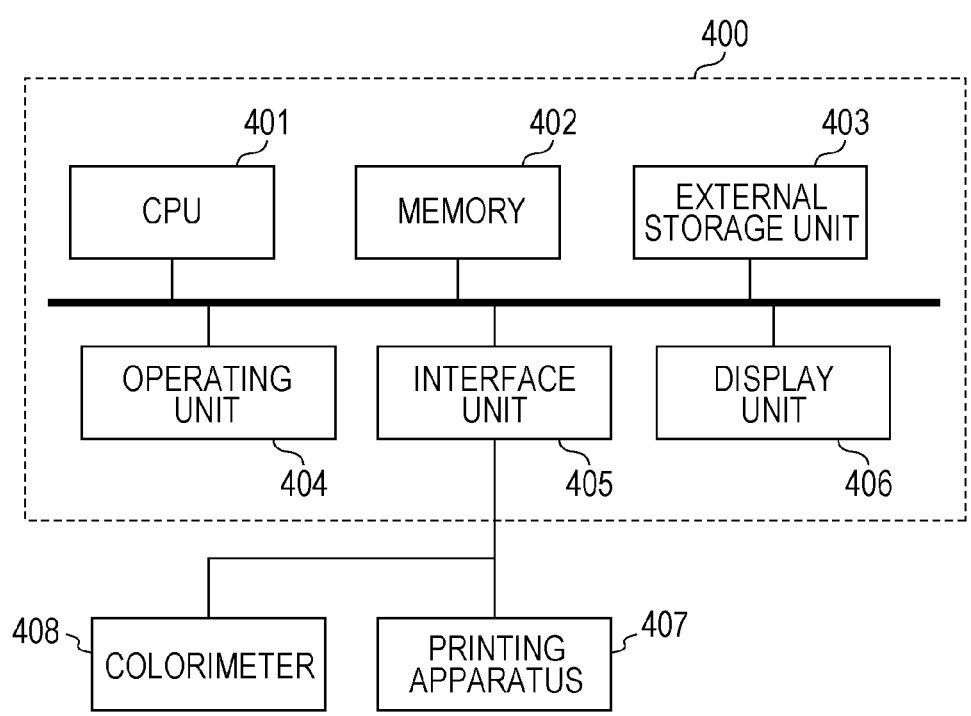
FIG. 4 is a diagram that illustrates the whole configuration of a color printing apparatus system.

FIG. 4 is a block diagram that illustrates the whole configuration of a printing system according to this embodiment. A host (PC) 400 includes a CPU 401, a memory 402, an external storage unit 403, an operating unit 404, an interface unit 405, a display unit 406, a printing apparatus 407, and a colorimeter 408. The CPU 401 performs image processing using data and a program (a printer driver or any other program) stored in the memory 402. A program that performs an embodiment of the present invention and data that is necessary for performing an embodiment of the invention are stored in a hard disk that is the external storage unit 403 and is loaded into the memory 402 as is necessary. For example, an OS, a printer driver, a software program used for generating a color separation table to be described later, image data to be printed, application software for generating image data, various kinds of data necessary for each program, and the like are stored in the memory 402. The operating unit 404 that is a user interface (hereinafter, referred to as an UI) inputs a user instruction and is configured by input I/F devices such as a keyboard and a mouse. The display unit 406 represents a display device such as a monitor that displays a screen used for inputting a user's instruction, a processing progress, and a processing result. In addition, the host 400 is connected to the printing apparatus 407 printing an image on a printing medium through the interface unit 405. In this embodiment, although an example is described in which the printing apparatus 407 is an ink jet printer, a thermal transfer printer, a dot printer, or the like may be used as the printing apparatus 407. The printing system according to this embodiment is formed by employing the above-described configuration.

The colorimeter 408 is connected to the host 400 through the interface unit 405. The colorimeter 408 measures the color of a patch chart printed by the printing apparatus 407 and stores the result thereof in the external storage unit 403. The host 400 transmits and receives various kinds of information and data in relation with the control of the printing apparatus 407 and the colorimeter 408. Such control is performed by executing software stored in the external storage unit 403 using the memory 402 and the CPU 401. By employing the system configuration including the colorimeter 408 as described above, it is possible to provide a method of generating a color separation table to be described later. In this embodiment, although the colorimeter 408 has a configuration separate from the printing apparatus 407, a configuration may be employed in which the colorimeter 408 is built in the printing apparatus 407. In addition, although image processing according to this embodiment is performed by the process of software such as a printer driver operating in the host 400, the image processing may be performed by the process of software or hardware in the printer.

Next, a conventional image processing method and an image processing method according to this embodiment will be described with reference to FIGS. 1A and 1B. FIG. 1A is a diagram that illustrates the conventional image processing method, and FIG. 1B is a diagram that illustrates the image processing method according to this embodiment. As described later in detail, while color matching information is determined based on the type of printing medium, the purpose of printing, and a printing mode in the conventional image processing method, the color matching information is determined based on the type of printing medium and the purpose of printing in the image processing method according to this embodiment. In the case illustrated in these drawings, image processing is performed by using a printer driver, and accordingly, only an image signal of RGB 8 bits is transmitted from a PC to a printer that is a printing apparatus. However, in a case where the RIP software solution is used, not an image signal of RGB but an image signal of CMYK is transmitted.

On the host (PC) 109 side, a printing medium setting unit 101, a printing purpose setting unit 102, and a printing mode setting unit 103, a color matching processing unit 104, a color matching information storing unit 105, and a color separation information storing unit 106 are included as a printing setting unit. The printing medium setting unit 101 sets the type of printing medium used for printing. In this embodiment, the type of printing medium on which an image is printed is selected from among "glossy paper", "plain paper", and a "matte paper". The printing purpose setting unit 102 selects and sets a printing purpose. In this embodiment, one of printing purposes of a "portrait photograph", a "landscape photograph", "minimal color difference", "vividness preference", and the like is selected and set. The printing mode setting unit 103 selects and sets the printing mode. Among the printing modes that can be executed in this embodiment, there are an image quality preference mode and a printing speed preference mode. In the case of an ink jet printer, by setting a printing purpose, the number of passes in the multi-pass printing, the scanning speed of a carriage on which the printing head is mounted, the resolution of an image, and the like are determined. In this embodiment, the printing mode is selected from among five printing modes of "high-definition", "highest", "fine", "standard", and "speedy".

Figure 3:
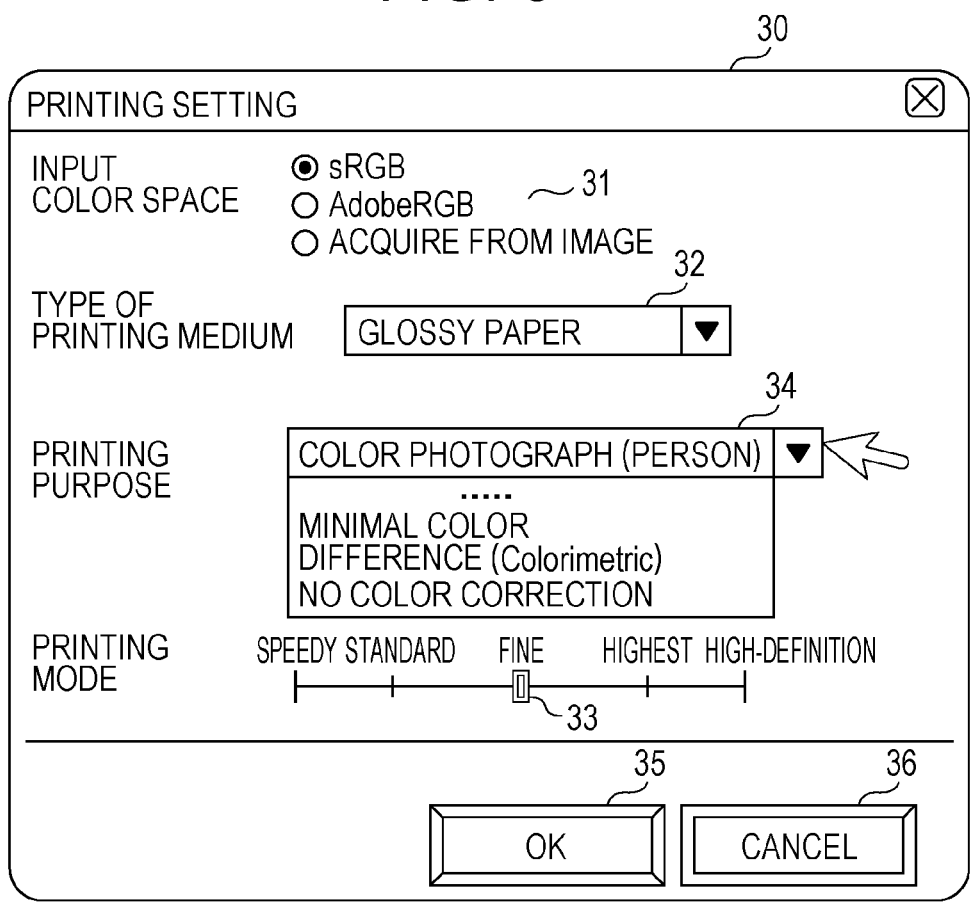
FIG. 3 is a diagram that illustrates an example of a menu screen used for printing setting.

Here, FIG. 3 illustrates an example of a menu screen 30 used for setting the printing conditions. In field 31, a color space of input image data is set. Here, an example is illustrated in which one is selected from three types of "sRGB", "dRGB", and "Acquisition From Image". In a case where "Acquisition From Image" is selected, the input conditions of the input image data are set by checking a header or the like of the image data. In field 32, the type of printing medium on which an image is printed is set. In field 33, one is selected from among five printing modes of "high-definition", "highest", "fine", "standard", and "speedy". In field 34, one is set out of five printing purposes of "color photograph (person)", "color photograph (landscape)", "minimal color difference", and "no color correction". After the selection and the setting of the conditions are completed, by clicking "OK" represented in field 35, the input is completed, and the process proceeds to the next process. In a case where the process is wanted to be returned to the previous process (not illustrated in the figure), "Cancel" represented in field 36 is clicked.

Referring back to FIG. 1, when image data of an RGB signal of which the color has been adjusted by a color adjustment processing unit (not illustrated in the figure) is input, the color matching processing unit 104 reads the color matching information from the color matching information storing unit. Then, the input image data of the RGB signal is converted into image data of an R'G'B' signal that is the so-called device RGB values using the color matching information and outputs the converted image data. Generally, the color matching process is performed by using a three dimensional lookup table (3D-LUT) that is the color matching information. Hereinafter, this 3D-LUT is referred to as a color matching table or a color correcting table. The color matching table is a table having lattice points of 16 levels or 32 levels for each color. In this embodiment, for image data of an 8-bit RGB signal, a table formed by 16 lattice points of 17 value intervals for each color, in other words, a table having 16×16×16=4,096 lattice points is used.

Here, in the conventional image processing method illustrated in FIG. 1A, the color matching information storing unit 105 stores a color matching table for each printing medium, for each printing purpose, and for each printing mode. For example, in the case of a printing apparatus corresponding to three types of printing media, four types of printing purposes, and five types of printing modes, color matching tables of 3×4×5=60 types are stored in the color matching information storing unit 105. On the other hand, in the image processing method according to this embodiment illustrated in FIG. 1B, the color matching information storing unit 105 stores a color matching table for each printing medium and for each printing purpose. In other words, according to the image processing method of this embodiment, setting information is not input from the printing mode setting unit 103. Accordingly, color matching information of this embodiment is information based on a combination of the printing medium setting unit 101 and the printing purpose setting unit 102 and does not depend on the information supplied from the printing mode setting unit 103. Therefore, according to the image processing method of an embodiment of the present invention, the number of color matching tables stored in the color matching information storing unit 105 can decrease to 3×4=12 types. As described later in detail, by generating color separation information used by the color separation processing unit 107 in accordance with a characteristic generating method of an embodiment of the present invention, the number of color matching tables can decrease.

Next, the color separation processing unit 107 converts the R'G'B' signal output from the color matching processing unit 104 into a signal corresponding to the ink colors used in the printing apparatus. In this embodiment, ink of six colors including cyan (C), light cyan (c), magenta (M), light magenta (m), yellow (Y), and black (K) is used. In this conversion, color separation tables, which are the color separation information, are used. These color separation tables are stored in the color separation information storing unit 106 and are stored for each printing medium and for each printing mode. The reason for this is that, as described above, a maximum value (maximum ink applying amount) of the amount of ink applied to each unit area is different in accordance with the type of printing medium and the printing mode, and the color gamut that can be reproduced is different in accordance therewith. In other words, the reason is that the color gamut is different in accordance with the printing conditions. Accordingly, in a case where an image is printed on the same printing medium in mutually-different printing modes, even when the same signal values of RGB are input, signal values of ink colors of CcMmYK output in accordance with the printing modes are different from each other. As a result, the measured color values (L*a*b* values) of the printed images are different from each other. According to the image processing method of this embodiment, color separation tables of 3×5=15 types are stored in the color separation information storing unit 106 in correspondence with printing media of three types and printing modes of five types.

In addition, in this embodiment, the color separation processing unit 107 and the halftone processing unit 108 are configured to be on the printing apparatus 111 side. The color separation processing unit 107 acquires an appropriate color separation table from the color separation information storing unit 106 based on the set printing conditions such as the printing medium information and the printing mode information.

The halftone processing unit 108 converts a color signal corresponding to the ink colors into ejection data that corresponds to ejection or no-ejection of ink from each nozzle of the printing head by using a quantization process such as error diffusion. Then, the halftone processing unit 108 outputs the ejection data to a printing control unit (not illustrated in the figure). The printing control unit ejects ink drops from nozzles of the printing head based on the ejection data, thereby printing an image on the printing medium. In this embodiment, although the quantization process performed by the halftone processing unit is a binarization process, a quarternarizing process, a quinary process, or the like may be performed based on the dot pattern or the form of the mechanism of the apparatus. In addition, in this embodiment, although the number of types of ink colors used for printing is six types of CcMmYK, for example, four types of CMYK may be used, and, furthermore, ink of red (R), green (G), blue (B), and gray (Gy) may be configured to be used.

Next, a method of generating the color separation table that is the color separation information according to this embodiment will be described with reference to FIG. 5. In this embodiment, a color separation table according to the present invention is generated based on a color separation table for each printing mode, which is used in the process performed by the color separation processing unit 107, generated by using a known method. Here, a method of generating a color separation table according to an embodiment of the present invention by using two color separation tables corresponding to printing modes of two types will be described. Here, the two printing modes will be referred to as printing mode A and printing mode B. Printing mode A is a mode in which the image quality is preferred more than printing mode B and is assumed to have the maximum ink applying amount that is more than that of printing mode B and have the color gamut that is broader than that of printing mode B.

Figure 5:
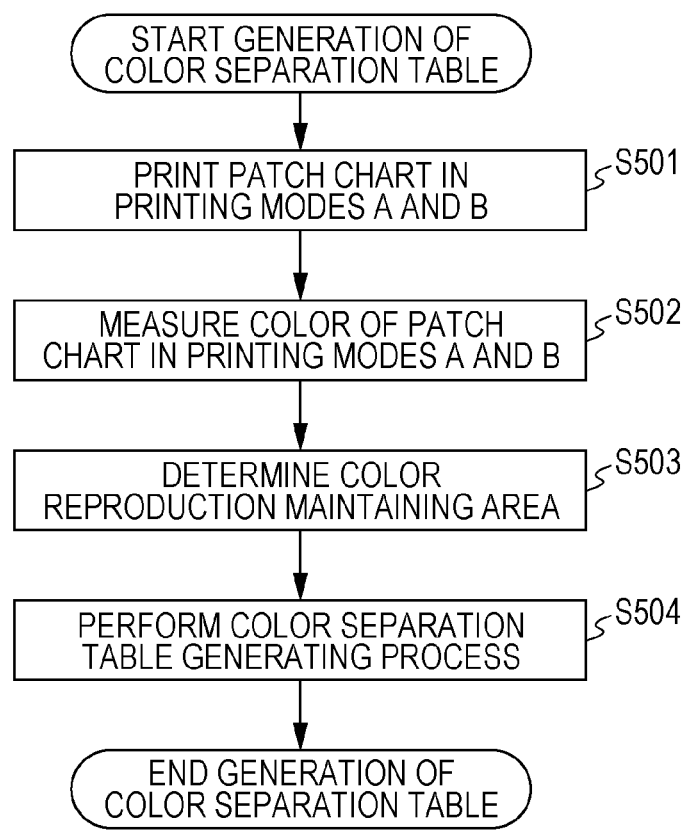
FIG. 5 is a flowchart that schematically illustrates a method of generating a color separation table.

First, a color separation table generating program illustrated in FIG. 5 is started up by the display unit 406 and the operating unit 404. This color separation table generating program is stored in the external storage unit 403. The started program is executed along the following process.

In Step S501, in order to acquire color reproduction data of printing modes A and B, a patch chart formed by a plurality of patches is printed. The patch chart is a chart that is formed by 12×12×12=1,728 patches formed by 12 gray scales of intervals of 23 values corresponding to RGB values. The patch chart is stored in the external storage unit 403 illustrated in FIG. 4 in advance and is printed in accordance with the program executed in the host 400. The process of printing the patch chart is performed by using the image processing method illustrated in FIG. 1. At this time, input RGB image data is the image data of the patch chart.

For the RGB image data input to the color matching processing unit 104, a process is performed in which the output value does not change from the input value. In other words, values that are the same as the input RGB values are output as the output R'G'B' values. In the color separation processing unit 107, color separation tables for printing modes A and B, which are stored in the external storage unit 403 in advance, are selected, and a color separation process is performed. This color separation tables are generated by using a known method. Thereafter, the data is binarized by the halftone processing unit 108 and is printed on a printing medium through a printing control unit not illustrated in the figure.

By respectively performing such a process for printing modes A and B, a patch chart printed by executing each printing mode using a color separation table corresponding to one of the two printing modes is acquired. In other words, by printing patch charts in each printing mode using color separation tables generated using a conventional method, an image used for acquiring color reproduction information for the device RGB values of the printing apparatus 407 can be acquired.

Next, in Step S502, the patches of the printed patch chart are measured by the colorimeter 408 illustrated in FIG. 4, and measured values are stored in the external storage unit 403. The measured values that have been measured by the colorimeter 408 are stored in the external storage unit 403 through the I/F 405 with the input RGB values and the measured values (L*a*b* values) of the patches corresponding to the input RGB values being associated with each other. In this embodiment, input RGB values of 1,728 patches printed in printing mode A and the measured L*a*b* values thereof are stored in association with each other, and, similarly, input RGB values of 1,728 patches printed in printing mode B and the measured L*a*b* values thereof are stored in association with each other.

Next, in Step S503, a color reproduction maintaining area is determined by using the measured L*a*b* values of the patch charts of printing modes A and B. Here, the color reproduction maintaining area is an area in which an image having the same measured L*a*b* value for the same input value in at least two or more color separation tables is printed, in other words, an area in which the same color gamut is formed. In this embodiment, the color reproduction maintaining area is determined by using the following method based on information of the color gamuts of printing modes A and B and information of printing measured values of lattice points disposed on the surface of parameters, for which a 3D-LUT process is performed by the color separation processing unit 107 in printing mode A.

Figure 6:
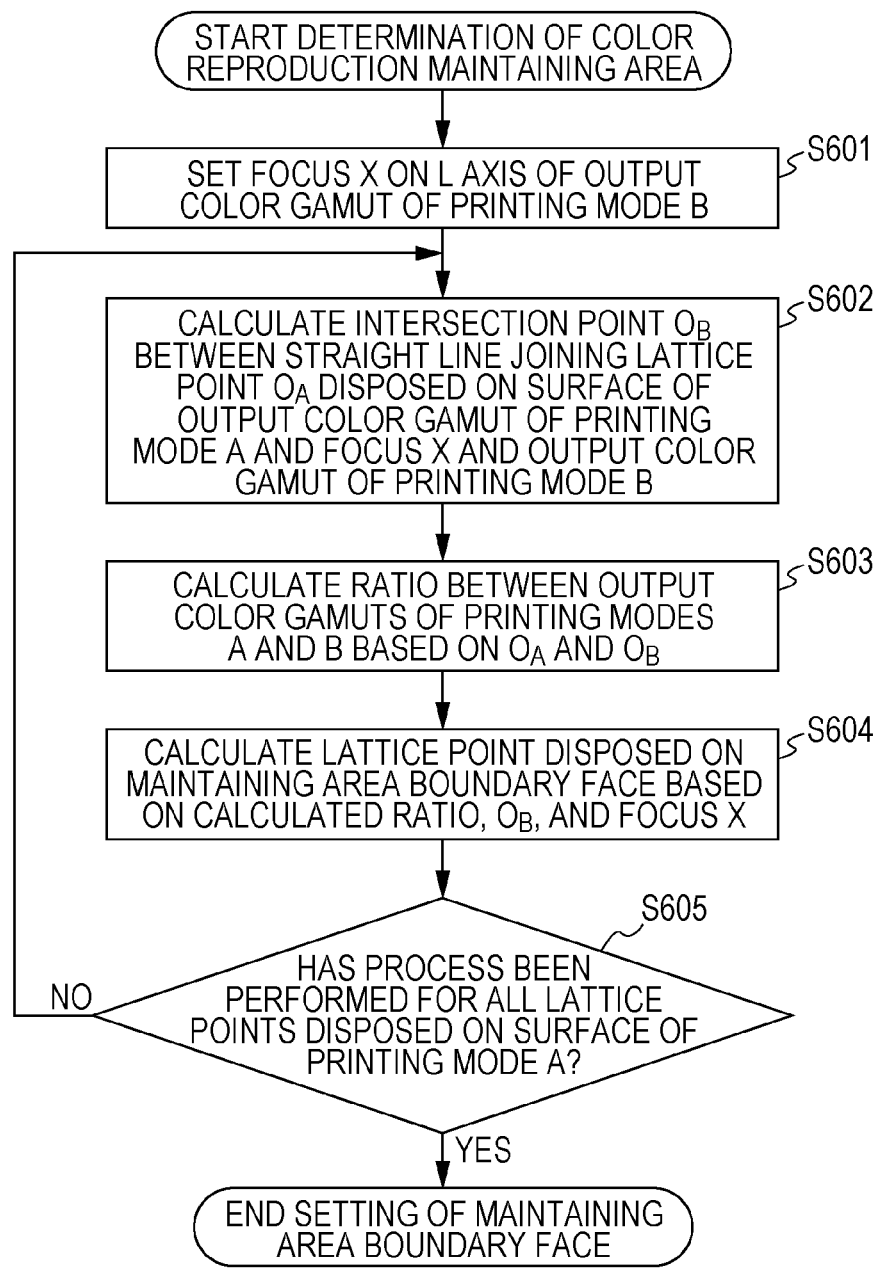
FIG. 6 is a flowchart that illustrates a method of determining a color reproduction maintaining area.
Figure 7A:
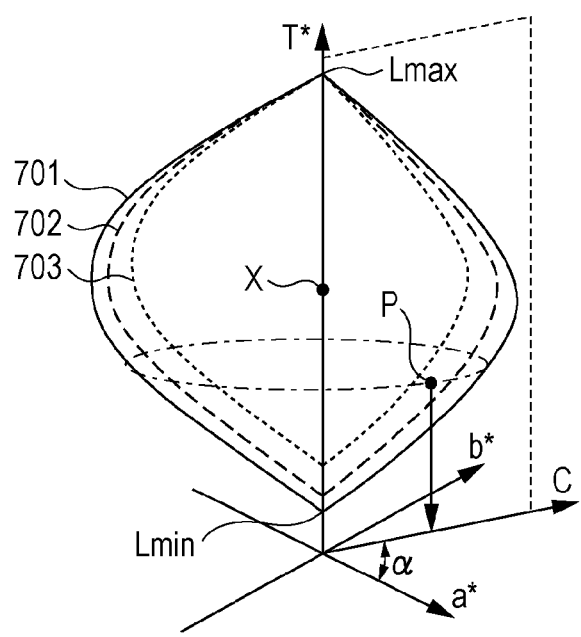
FIGS. 7A and 7B are diagrams that illustrate a method of setting a maintaining area according to a first embodiment.
Figure 7B:
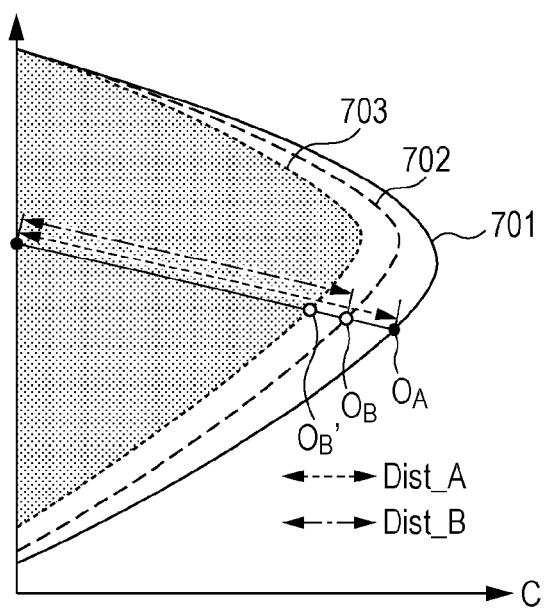

Hereinafter, the method of determining a color reproduction maintaining area will be described with reference to FIGS. 6, 7A, and 7B. First, in Step S601, in order to acquire a color reproduction maintaining area, a focus X is set on the L axis as a focus in the color compression direction. Here, a color gamut curve is calculated in the L*a*b* color space by using a known technology using measured values of printing modes A and B stored in the external storage unit 403. FIG. 7A is a perspective view that illustrates the whole color gamut face 701 of printing mode A and the whole color gamut face 702 of printing mode B. In this embodiment, a middle point between an Lmax value of a paper white portion and an Lmin value of a black printed portion of the whole color gamut face 701 of printing mode A is set as the focus X. As the method of determining a focus X, a method may be used in which an average value of L* values of the maximum hues for each hue angle is used other than the method using the middle point.

Subsequently, in Step S602, an intersection point $O_B$ between a straight line joining a lattice point $O_A$ disposed on the surface of the color gamut curved face 701 of printing mode A and the focus X and the outermost shell of the color gamut curved face 702 of printing mode B is calculated. FIG. 7B is a diagram that illustrates the calculation thereof. First, the color separation processing unit 107 corresponding to printing mode A selects a lattice point that is a processing target from among lattice points disposed on the surface of a cube of the 3D-LUT process. Then, a hue-L* coordinate system illustrated in FIG. 7B is calculated based on information of the hue angle (α) of the L*a*b* value of the lattice point P that is the processing target. FIG. 7B illustrates the color gamut curved face 701 of printing mode A and the color gamut curved face 702 of printing mode B. Then, in this coordinate system, an intersection point $O_B$ between a straight line joining an arbitrary point $O_A$ disposed on the color gamut curved face 701 of printing mode A and the focus X and the color gamut curved face 702 of printing mode B is calculated. Each value is calculated with the length of the straight line joining an arbitrary point $O_A$ and the focus X assumed to be Dist_A and the length of a straight line joining the intersection point $O_B$ and the focus X assumed to be Dist_B.

Subsequently, in Step S603, the ratio Dist_Ratio of a difference between the color gamut curved faces of printing modes A and B is calculated by using Equation (1) using the lengths Dist_A and Dist_B.

$$\text{Dist\_Ratio} = \text{Dist\_}B/\text{Dist\_}A \quad \text{Equation (1)}$$

In Step S604, a boundary point $O_B'$ of the color reproduction maintaining area is calculated by using Equation (2) using the Dist_Ratio calculated in Equation (1).

$$O_B' = (O_B - X) \times \text{Dist\_Ratio} + X \quad \text{Equation (2)}$$

The above-described calculation is performed for the area on the color gamut curved face 701 of printing mode A, whereby a color reproduction maintaining area curved face 703 at this hue angle is calculated.

In Step S605, it is checked whether or not the process of Steps S602 to S604 has been performed for all the lattice points disposed on the surface of the cube of the 3D-LUT process that is the color separation processing unit 107 of printing mode A. In a case where the process has not been completed for all the lattice points, the process is returned to Step S602, and the process is repeated. On the other hand, in a case where the process has been completed for all the lattice points, a color gamut surface 703 for L*a*b* values of the entire area of the printing range is calculated using a known technology such as an interpolation process, and the process of Step S503 for determining the color reproduction maintaining area ends.

In the above-described process, although an example is illustrated which is based on information at hue angles of the lattice points disposed on the rectangular surface in the 3D-LUT process, which is the color separation processing unit 107 of printing mode A, a similar process using hue angles having an equal space therebetween, which are set in advance, may be performed.

Referring back to FIG. 6, in Step S504, color separation tables are generated based on the information of the color reproduction maintaining area determined in Step S503. Here, based on the color separation tables corresponding to printing modes A and B, which are generated using a known technology, two tables are generated such that color reproductions of the printing modes coincide with each other in the color reproduction maintaining area determined in Step S503, and color reproductions of the printing modes are different from each other in an area other than the color reproduction maintaining area. In this embodiment, the coincidence of the color reproductions represents that, in a case where the same input RGB value is input, by executing the printing modes for data converted using tables corresponding to the printing modes, the measured values of printed images are the same. Here, in a case where a color difference ΔE between two images is less than 1.2, the measured values are assumed to be the same, and, in a case where the color difference ΔE in a CIE-Lab space is 1.2 or more, the measured values are assumed to be different from each other.

In addition, in the two tables, colors for an area other than the color reproduction maintaining area are generated so as to form color separation tables in which the color reproduction characteristics of each printing mode are expressed. In this embodiment, by changing values of the color separation table corresponding to printing mode B using the color separation table corresponding to printing mode A, which is generated using a conventional technology, a new color separation table B' is generated.

Furthermore, the same advantages can be acquired by setting a new target value based on printing modes A and B as a target value within the color reproduction maintaining area and newly generating color separation tables of both the printing modes A and B that have been generated by using a conventional technology.

Figure 10:
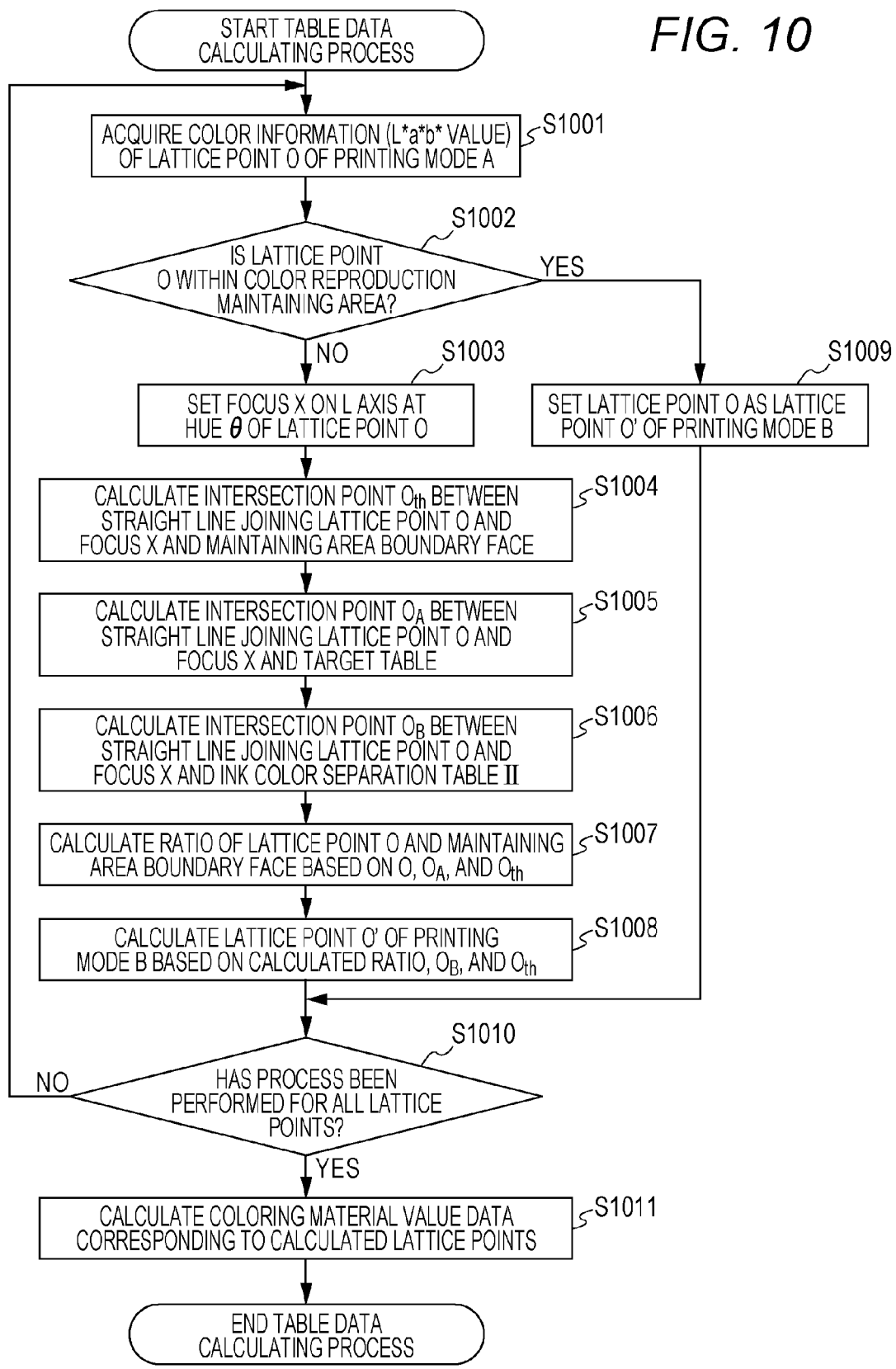
FIG. 10 is a flowchart that illustrates a color separation table generating process.

Hereinafter, description will be presented with reference to a flowchart illustrated in FIG. 10. In Step S1001, an L*a*b* value corresponding to the RGB value of a lattice point of interest, that is, a target lattice point of printing mode A is acquired. More specifically, an input RGB value and a measured L*a*b* value of the target lattice point are determined based on color reproduction data formed by an input RGB value of each patch of the patch chart corresponding to printing mode A, which is measured in Step S502, and a measured value of the patch.

In Step S1002, it is determined whether the determined L*a*b* value is a value within the color reproduction maintaining area or a value outside the color reproduction maintaining area based on the information of the color reproduction maintaining area acquired in Step S503. In the case of a value outside the color reproduction maintaining area, the process proceeds to Step S903. On the other hand, in the case of a value within the color reproduction maintaining area, the process proceeds to Step S910.

Hereinafter, a method of generating a color separation table B' corresponding to printing mode B outside the color reproduction maintaining area in Steps S1003 to S1008 will be described.

In Step S1003, in order to calculate an L*a*b* value that is a target of the printing color corresponding to the RGB value of the lattice point as a processing target, the RGB value is mapped onto two-dimensional coordinates of L*, whereby a focus X that is necessary for calculating the target value is set. Similarly to the description presented with reference to FIG. 7, a color gamut curve on the L*a*b* color space is calculated by using a known technology using measured values, which are stored in the external storage unit 403, of printing modes A and B. FIGS. 11A and 11B illustrate a result thereof. FIG. 11A is a perspective view and FIG. 11B illustrates the appearance of a hue-L* coordinate system corresponding to the hue angle β at a point O represented by the L*a*b* value of the colors of an image printed in accordance with the target RGB value. FIG. 11A illustrates a whole color gamut face 1101 of printing mode A, a whole color gamut face 1102 of printing mode B, and a color reproduction maintaining area face 1103. FIG. 11B illustrates a color gamut curved face 1104 of printing mode A, a color gamut curved face 1105 of printing mode B, and a color reproduction maintaining area curved face 1106. In this embodiment, a focus X is set to the brightness at the coordinates of a highest chroma at a hue angle β on the color gamut curved face 1105 of printing mode B. Here, the focus X may be set using another method. For example, a focus X may be set between a point of brightness corresponding to a paper white color of printing mode B and a point of brightness corresponding to a black point (darkest point), and the focus may be set as not one fixed focus but a focus of which L* changes within the range of a predetermined area using a known method.

In Step S1004, an intersection point $O_{th}$ between a straight line joining the lattice point O and the focus X and the color reproduction maintaining area curved face 1106 is acquired, and a distance Dist.Th_O between the intersection point $O_{th}$ and the lattice point O is calculated.

In Step S1005, an intersection point $O_A$ between a straight line joining the lattice point O and the focus X and the color gamut curved face 1105 of printing mode A is acquired, and a distance Dist.Th_$O_A$ between the intersection point $O_{th}$ and the intersection point $O_A$ is calculated.

In Step S1006, an intersection point $O_B$ between a straight line joining the lattice point O and the focus X and the color gamut curved face 1105 of printing mode B is acquired.

In Step S1007, a ratio Dist.Th_Ratio from the lattice point O to the color reproduction maintaining area curved face 1106 is acquired using the following Equation (3).

$$Dist.Th\_Ratio = Dist.Th\_O / Dist.Th\_O_A \quad \text{Equation (3)}$$

In Step S1008, a lattice point O' of printing mode B corresponding to the lattice point O of printing mode A is calculated by using Equation (4).

$$O' = (O_B - O_{th}) \times Dist.Th\_Ratio + O_{th} \quad \text{Equation (4)}$$

From this, the L*a*b* value of the lattice point O' can be calculated. In this embodiment, in a case where the lattice point O that is a target is outside the maintaining area, although the L*a*b* value of the lattice point O' is acquired by the process of Steps S1003 to S1008, it may be acquired by using a known color gamut compressing method or the like. In addition, lattice point data may be acquired such that the lattice point disposed on a line from the paper white color to a primary color is formed in a primary color. Particularly, since yellow tends to have low graininess in a case where another color of a coloring material joins it, by compressing lattice points on a line of a primary color of the color separation table as a base, such a problem can be avoided.

Step S1009 is a process performed in a case where the L*a*b* value that is the target of the printing color corresponding to the RGB value of the lattice point O, which is a processing target, is within the maintaining area. In this process, the L*a*b* value of the lattice point O' of printing mode B that corresponds to the lattice point O of printing mode A is set to a value that is the same as the L*a*b* value of the lattice point O of printing mode A.

In Step S1010, it is determined whether the process starting from Step S1001 is performed for each lattice point, and all the lattice points have been processed. In a case where the process has performed for all the lattice points, the process proceeds to Step S1011. On the other hand, in a case where the process has not been completed for all the lattice points, the process is returned to Step S1001, and the process of Steps S1002 to S1010 is performed for the next lattice point O.

In Step S1011, a coloring material value that is the L*a*b* value of each lattice point O' calculated in the process up to Step S1010, that is, a CcMmYk value is calculated and is stored in the lattice point of printing mode B. In this embodiment, a tetrahedron including the L*a*b* value of the lattice point O' is searched out of tetrahedrons of the color gamut based on the color gamut information of printing mode B. Then, a coloring material value of printing mode B that corresponds to the L*a*b* value of the lattice point O' is calculated through an interpolation calculation and is stored as lattice point data of the color separation table B' corresponding to printing mode B.

Figure 12A:
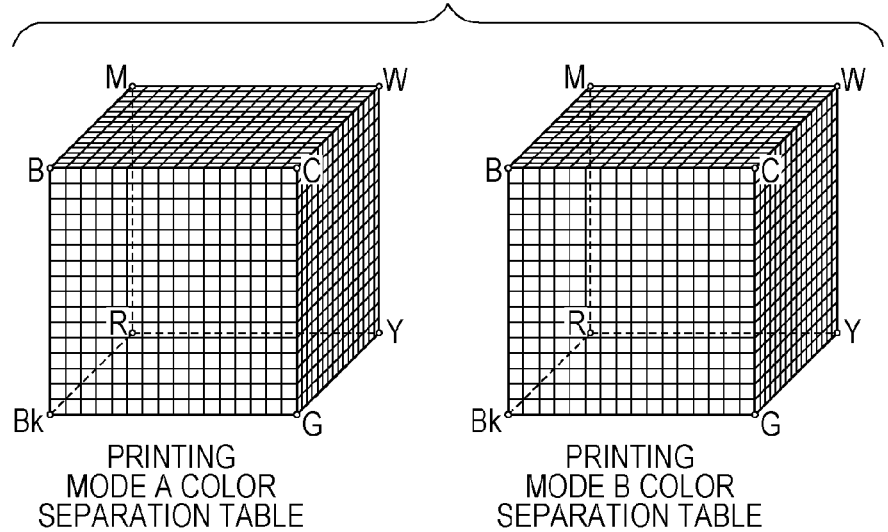
FIGS. 12A and 12B are conceptual diagrams that illustrate color gamuts of a color separation table according to an embodiment of the present invention.
Figure 12B:
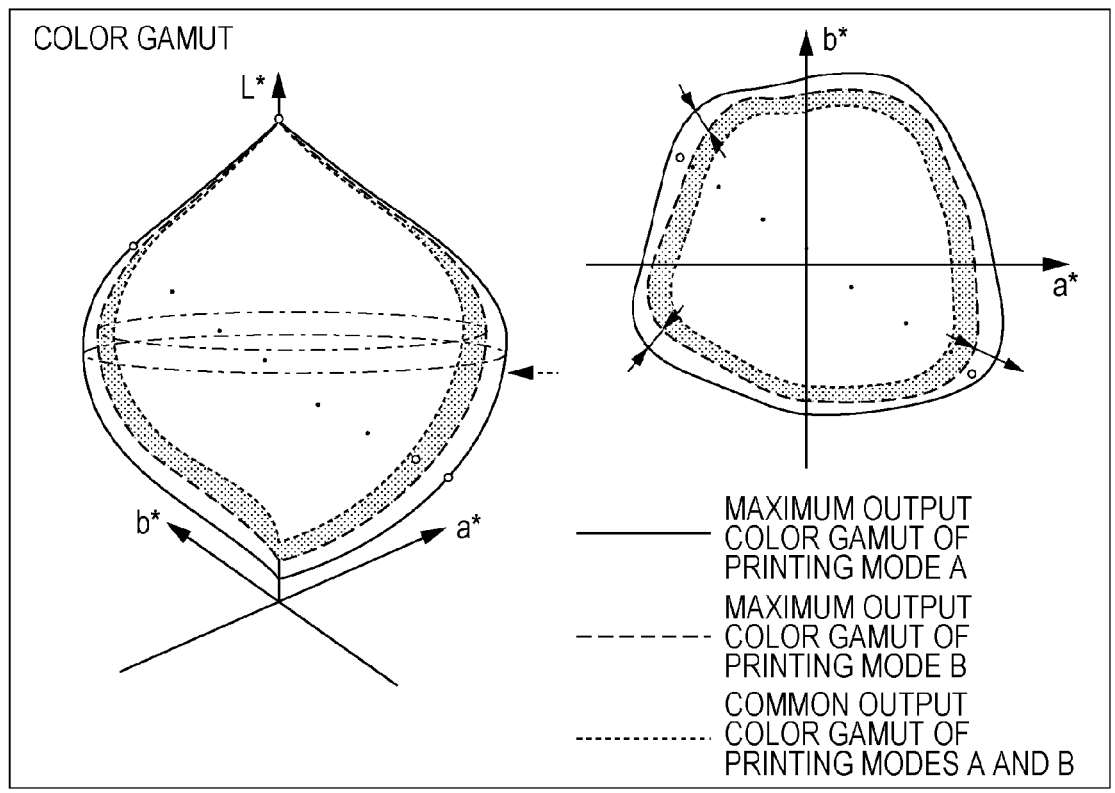

The color separation table generated by performing the above-described process is illustrated in FIG. 12. In the color separation table corresponding to printing mode B', which is generated according to this embodiment, an output value for a lattice point present within the color reproduction maintaining area coincides with an output value for a lattice point of the color separation table that corresponds to printing mode A. Here, the output value is a measured value acquired by measuring a printed image. In other words, for the same input RGB value, a measured value of an image printed in printing mode A and a measured value of an image printed in printing mode B are the same. In addition, for a lattice point present outside the maintaining area, an image can be printed in which, for the same input RGB value, the color tone of an image printed in printing mode A and the color tone of an image printed in printing mode B are felt to be the same.

Figure 13A:
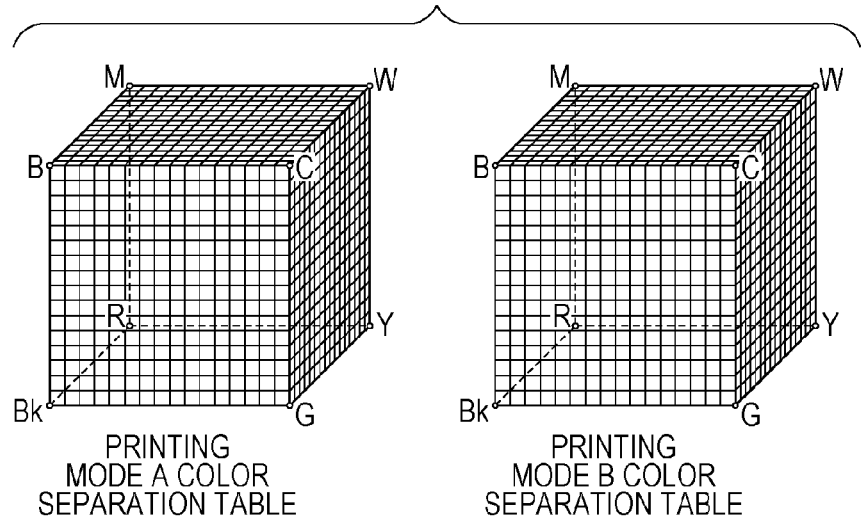
FIGS. 13A and 13B are conceptual diagrams that illustrate color gamuts of a conventional color separation table.
Figure 13B:
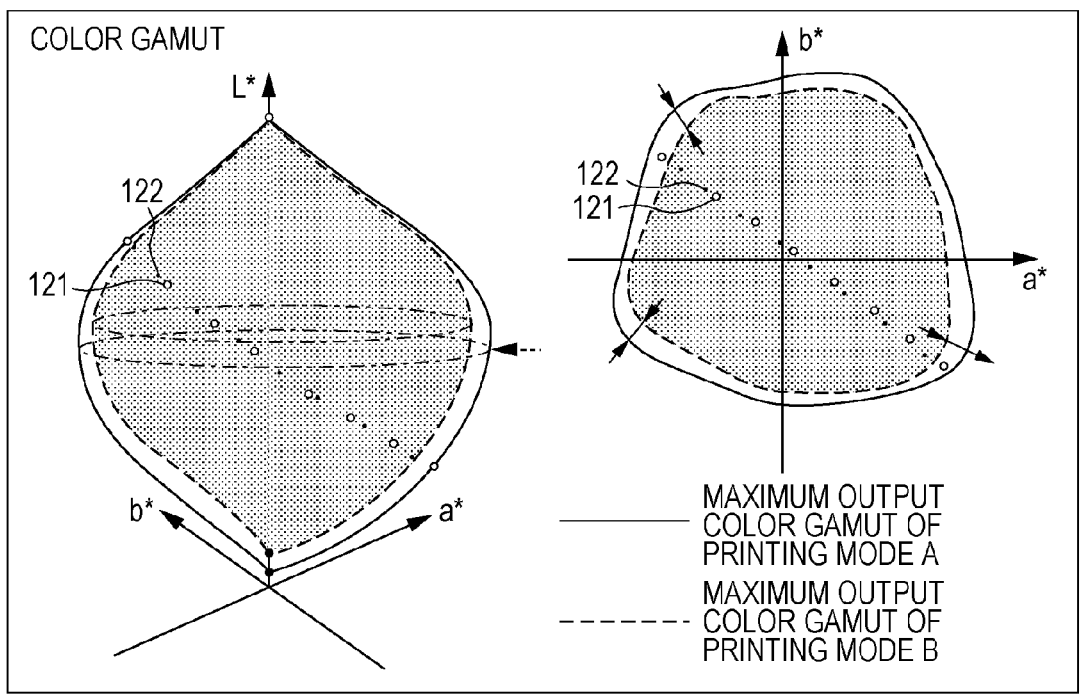
Figure 14A:
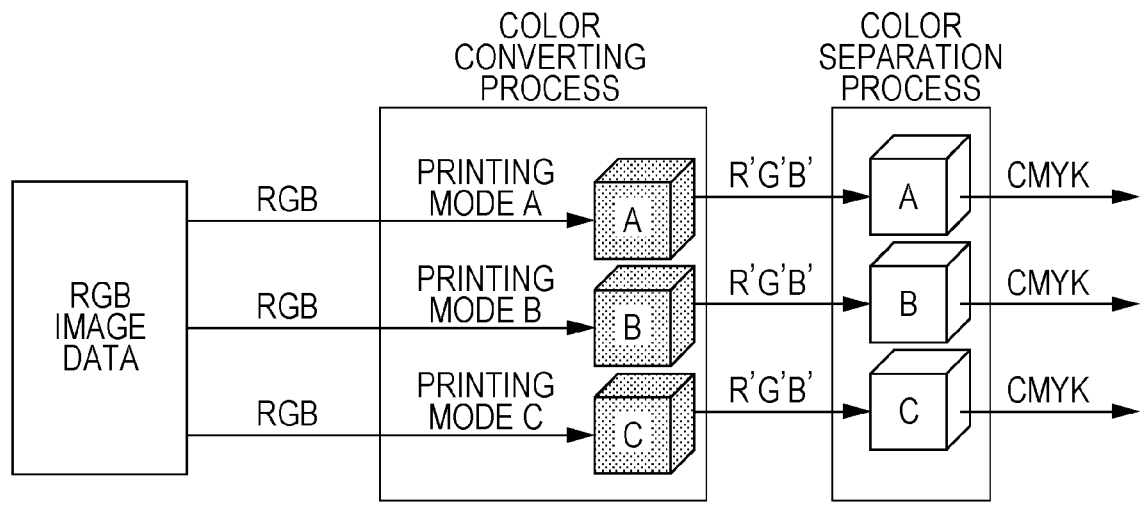
FIGS. 14A and 14B are diagrams that schematically illustrate a conventional color converting process and a color converting process according to an embodiment of the present invention.

As illustrated in FIG. 13, in the conventional method, there is a difference in the output value for the same RGB value between the printing modes. The reason for this is that design for maximizing the color gamut of each printing mode is performed. As above, in a case where the output value is different for each printing mode, in order to perform a high-definition color matching output, as illustrated in FIG. 14A, a color matching table used for performing color matching of the RGB value of an input image needs to be prepared for each printing mode.

Figure 14B:
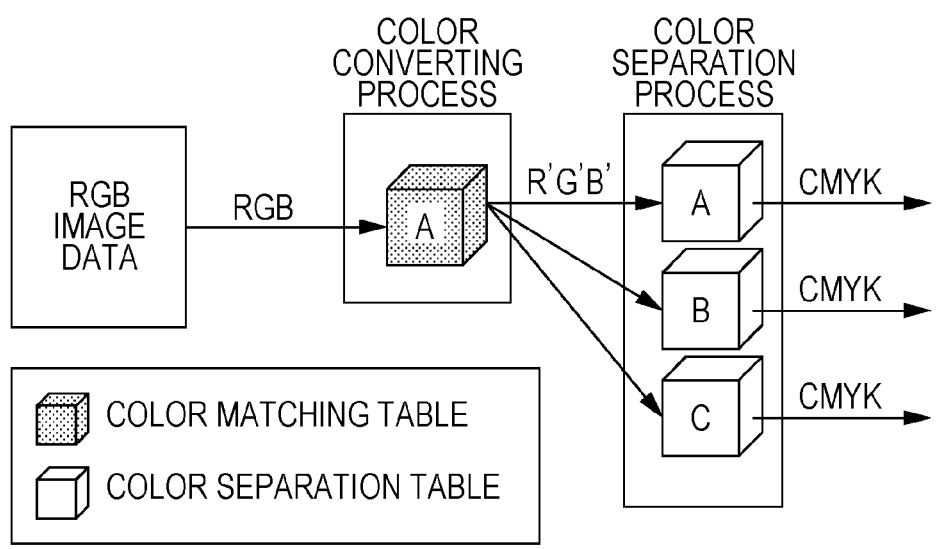

Meanwhile, according to an embodiment of the present invention, a color reproduction maintaining area is set, and a color separation table is generated such that the output values in the printing modes are the same within the color reproduction maintaining area, and the color tones are the same in the printing modes in an area other than the color reproduction maintaining area. By using such a color separation table, the color separation process can be performed in which an image of a color that is different for each printing mode is not printed in a case where the same RGB value is input. From this, as illustrated in FIG. 14B, one color matching table that is common to a plurality of printing modes may be prepared, whereby enlargement of the capacity of the memory can be suppressed.

In addition, in a case where the color separation table is designed so as to match a printing mode having a narrowest output color gamut, although the output values can match between printing modes, the color gamut of each printing mode cannot be utilized to a maximum extent, and an image having an insufficient tone is represented.

According to an embodiment of the present invention, the color gamut of each printing mode is utilized to a maximal extent, and, output values for an input value match as possibly as can, whereby the amount of information necessary for performing color matching of an input image can decrease. As a result thereof, the capacity of the external storage unit 403 of the host 100 necessary for storing the printer driver can decrease.

In addition, in this embodiment, in a case where printing is performed for the same printing medium, although the color separation table for a plurality of printing modes has been described to be generated using the method according to an embodiment of the present invention, the method is not limited thereto. Thus, by designing the output value to be the same within the maintaining area for each printing medium, similar advantages can be acquired. By generating the color separation table as above, the color matching table can be used to be common also to printing media having paper white colors and the tendencies of color development that are similar to each other, the amount of information decreases, whereby the required memory capacity can decrease.

Furthermore, even in a case where a user independently generates a color matching table such as an ICC profile, the color matching table does not need to be generated for each printing mode, whereby the number of processes can decrease. In addition, since a color profile does not need to be designated for each printing mode, the user convenience is improved.

Second Embodiment

Next, a second embodiment of the present invention will be described. This embodiment illustrates an embodiment in which the process of determining a color reproduction maintaining area is different from that of Step S503 illustrated in FIG. 5. Since the other processes are the same as those of the first embodiment, description thereof will not be presented.

In the first embodiment described above, although a color reproduction maintaining area is acquired in accordance with a difference between the color gamuts of printing modes A and B, as illustrated in FIGS. 8A and 8B, the color reproduction maintaining area may be uniformly determined for printing mode B having a relatively narrow color gamut. Similarly to the case illustrated in FIGS. 7A and 7B, a color gamut curve is calculated in the L*a*b* color space by using a known technology using measured values of printing modes A and B that are stored in the external storage unit 403. FIGS. 8A and 8B are diagrams illustrating a result thereof, FIG. 8A is a perspective view, and FIG. 8B illustrates the appearance at an arbitrary hue angle θ. FIG. 8A illustrates a whole color gamut face 801 of printing mode A and a whole color gamut face 802 of printing mode B. FIG. 8B illustrates a color gamut curved face 804 of printing mode A and a color gamut curved face 805 of printing mode B. The color reproduction maintaining area curved face 806 can be calculated by reducing the color gamut curved face 805 of printing mode B at equal intervals. As described above, a color reproduction maintaining area face 803 at the L*a*b* value of the whole printing range is calculated by using a result thereof, and the process of determining a color reproduction maintaining area of Step S503 ends.

Third Embodiment

Next, a third embodiment of the present invention will be described. This embodiment illustrates an embodiment in which the process of determining a color reproduction maintaining area is different from that of Step S503 illustrated in FIG. 5. Since the other processes are the same as those of the first embodiment, description thereof will not be presented.

In the first and second embodiments described above, by calculating a color reproduction maintaining area based on a result of the measurement of the color gamut in each printing mode, the color reproduction maintaining area is determined. In this embodiment, a color reproduction maintaining area is determined based on an L*a*b* value that is a printing color at the lattice point in the 3D-LUT process of printing mode B having a relatively narrow color gamut.

Figure 9:
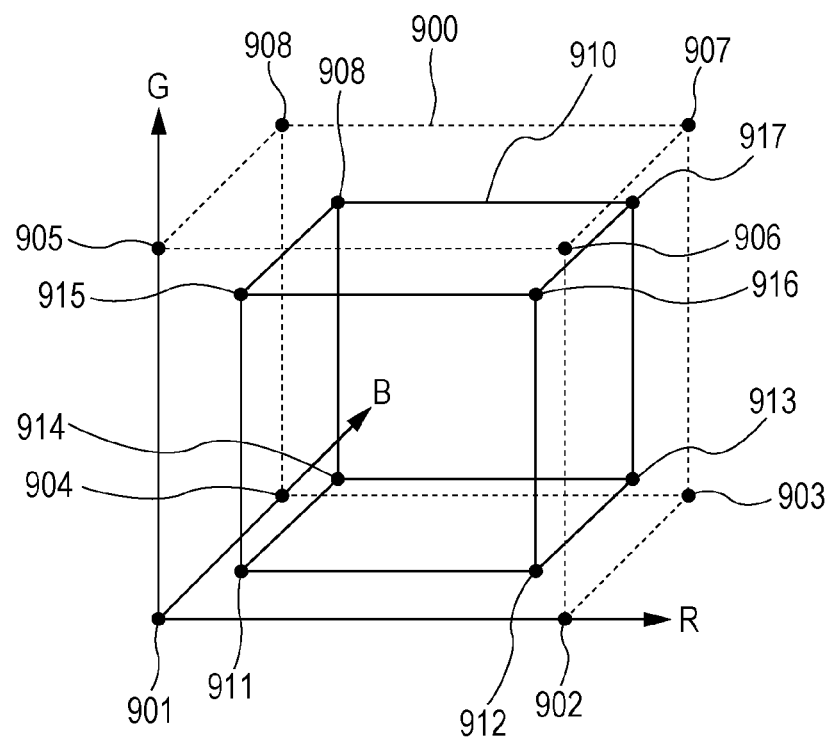
FIG. 9 is a diagram that illustrates a method of setting a maintaining area according to a third embodiment.

FIG. 9 is a diagram that illustrates the concept of color parameters in the 3D-LUT process performed by the color separation processing unit in printing mode B. The lattice points are formed by 16 lattices, and a value of the input RGB signal data at a lattice point is denoted by R(i), G(j), and B(k) (here, i, j, k=0, 1, 2, . . . 15). At a lattice point as a color parameter, a coloring material color signal (CcMmYK output value) is set such that a printing color of a target L*a*b* value is reproduced for an input value of R(i), G(j), and B(k). Color parameter 900 represents all the color parameters. Meanwhile, color parameter 910 represents a color parameter disposed on the further inner side of color parameter 900 by the predetermined number of lattice points. Lattice points 901, 902, 903, 904, 905, 906, 907, and 908 represent apex parts, and CcMmYK values of the coloring material color signals are set for the input RGB values corresponding thereto at the above-described lattice points, whereby a printing color is reproduced. An input RGB value at lattice point 901 represents R(0), G(0), and B(0). An input RGB value at lattice point 902 represents R(15), G(0), and B(0). An input RGB value at lattice point 903 represents R(15), G(0), and B(15). An input RGB value at lattice point 904 represents R(0), G(0), and B(15). An input RGB value at lattice point 905 represents R(0), G(15), and B(0). An input RGB value at lattice point 906 represents R(15), G(15), and B(0). An input RGB value at lattice point 907 represents R(15), G(15), and B(15). An input RGB value at lattice point 908 represents R(0), G(15), and B(15). For each input value, a printing color associated with a coloring material color signal value CcMmYK is reproduced. In this embodiment, an area used for determining a color reproduction maintaining area is generated based on color parameters that are disposed on the further inner side from the color parameter 900 by the predetermined number of lattice points, which is a feature of the third embodiment. Here, the predetermined number of lattices is set to two. The predetermined number of lattices may be a value of at least one or more. Thus, an input RGB value of the lattice point of color parameter 910 represents R(2), G(2), and B(2) for lattice point 911. An input RGB value thereof for lattice point 912 represents R(13), G(2), and B(2). An input RGB value thereof for lattice point 913 represents R(13), G(2), and B(13). An input RGB value thereof for lattice point 914 represents R(2), G(2), and B(13). An input RGB value thereof for lattice point 915 represents R(2), G(13), and B(2). An input RGB value thereof for lattice point 916 represents R(13), G(13), and B(2). An input RGB value thereof for lattice point 917 represents R(13), G(13), and B(13). An input RGB value thereof for lattice point 918 represents R(2), G(13), and B(13). For each input value, a printing color associated with a coloring material color signal value CcMmYK is reproduced. The color gamut of the color parameters 910 formed by such apexes is determined as a color reproduction maintaining area. More specifically, a color gamut of the color parameters 910 can be calculated by using a known technology based on measured L*a*b* values of patch units of 1,728 kinds that are printed in printing mode B as described above and is stored in the external storage unit 403.

Other Embodiments

In the above-described embodiments, although a case where the input image data is an RGB value has been described as an example, as illustrated in FIG. 15, the same advantages can be acquired also in a case where the input image data is a CMYK value. Hereinafter, an image processing unit will be described, which handles CMYK data. On the host side, as a printing setting unit, a target setting unit 1601 a printing medium setting unit 1602, a printing purpose setting unit 1603, and a printing mode setting unit 1604 are included. In addition, a color matching processing unit 1605, a CMYK-to-L*a*b* converting unit 1606, an L*a*b*-to-CMYK converting unit 1607, a target information storing unit 1608, a printer information storing unit 1609, and a color separation information storing unit 1610 are included. The target setting unit 1601 sets information defining a CMYK signal such as SWOP or JapanColor. The printing medium setting unit 1602 sets a type of printing medium used for printing. For example, a type of printing medium on which an image is to be printed is selected from among "glossy paper", "coating paper", "plain paper", and the like and is set. The printing purpose setting unit 1603 selects one from among a plurality of printing purposes such as "photograph-like", "minimal color difference", and "vividness preference" and sets the selected printing purpose. The printing mode setting unit is the same as that of the above-described embodiment, and thus, description thereof will not be presented.

The color matching processing unit 1605 is configured by the CMYK-to-L*a*b* converting unit 1606 and the L*a*b*-to-CMYK converting unit 1607. CMYK image data is input, and appropriate color management information is read from the target information storing unit 1608 and the printer information storing unit 1609 in accordance with set values of the target setting unit 1601, the printing medium setting unit 101, and the printing purpose setting unit 102. Then, the process is performed using the values, and an image data signal of C'M'Y'K' is output. The CMYK-to-L*a*b* converting unit 1606 selects an appropriate ICC color profile from the target information storing unit based on the information set by the target setting unit 1601 and performs the process. Here, a CMYK signal value is converted into an L*a*b* value defined in an ICC color file. The L*a*b*-to-CMYK converting unit 1607 selects an appropriate ICC color profile from the printer information storing unit 1609 based on the information set by the printing medium setting unit 1602 and the printing purpose setting unit 1603. Here, an L*a*b* signal value is converted into a printing apparatus-specific C'M'Y'K' value that is defined in the ICC color file. The L*a*b*-to-CMYK converting unit 1607 is performed by a known 3D-LUT process. In this 3D-LUT process, the number of lattice points is configured as 16 levels or 32 levels for each color. A difference from the RGB process described above is that not a three-dimensional signal but a four-dimensional signal is output for an input of three-dimensional data. In the color separation information storing unit 1610, color parameters used for converting a CMYK image signal into six image signals of CcMmYK, which are coloring material colors, using a color separation processing unit 1611 are stored as the color separation information. This is a 4D-LUT process according to an input of four-dimensional signal of the CMYK signal instead of the input of an RGB signal described above and can be performed by using a known technology. The color separation information is formed by information for each printing medium and for each printing mode. As described above, since the maximum ejection amount is different for each printing mode, color reproduction is different for each printing mode. In other words, even in a case where printing is performed for the same printing medium, a CcMmYK ink color signal value that is an output value for the same input CMYK signal value is different for each printing mode. Accordingly, the output values are different from each other. In other words, measured L*a*b* values acquired by measuring the color of a printed image represent mutually-different values. Accordingly, in a case where there are printing media of three types and printing modes of five types, color separation information of 3×5=15 types is stored in the color separation information storing unit 1610 as the information.

On the printing apparatus side, the color separation processing unit 1611 and the halftoning processing unit 1612 are represented as units that are necessary for the configuration of the an embodiment of present invention. The color separation processing unit 1611 performs the process with color parameters of appropriate color separation information being set based on the printing medium information and the printing mode information set by the color separation information storing unit 1610. The color separation processing unit 1611 also performs a known 4D-LUT process. The halftoning processing unit 1612 is the same as that of the above-described embodiment, and thus, description thereof will not be presented.

Even in a case where the input image data is a CMYK signal as above, based on the color separation information corresponding to each printing mode, which is generated in advance, an embodiment of the present invention can be performed based on the color gamut information and the information of CMYK values of lattice points included in the information.

Other Embodiments

Embodiments of the present invention can also be realized by a computer of a system or apparatus that reads out and executes computer executable instructions printed on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-065660, filed Mar. 22, 2012, which is hereby incorporated by reference herein in its entirety.

What is claimed is:

1. An image processing method for a printing apparatus that prints an image by executing one of a plurality of printing modes, the image processing method comprising:

a color correcting step of performing color correction of an input image signal to an image signal represented in a first color space by using a color profile; and a color separating step of performing color separation of the image signal color-corrected in the color correcting step into an image signal represented in a second color space different from the first color space by using a color separation table corresponding to a printing mode executed by the printing apparatus out of a plurality of color separation tables including a first color separation table corresponding to a first printing mode and a second color separation table corresponding to a second printing mode, wherein a difference between a first measured value and a second measured value is less than a predetermined value, the first measured value being acquired by measuring an image printed by executing the first printing mode using the printing apparatus based on a second image signal acquired by performing color separation of a first image signal color-corrected in the color correcting step using the first color separation table, the second measured value being acquired by measuring an image printed by executing the second printing mode using the printing apparatus based on a third image signal acquired by performing color separation of the first image signal using the second color separation table, and wherein a difference between a third measured value and a fourth measured value is the predetermined value or more, the third measured value being acquired by measuring an image printed by executing the first printing mode using the printing apparatus based on a fifth image signal acquired by performing color separation of a fourth image signal color-corrected in the color correcting step using the first color separation table, the fourth measured value being acquired by measuring an image printed by executing the second printing mode using the printing apparatus based on a sixth image signal acquired by performing color separation of the fourth image signal using the second color separation table.

2. The image processing method according to claim 1, wherein the first, second, third, and fourth measured values are Lab values in a CIE-Lab space, and the predetermined value $\Delta E=1.2$.

3. The image processing method according to claim 1, wherein at least one of the number of relative scans between a printing head included in the printing apparatus and a unit area arranged on a printing medium, a scanning speed of the printing head, and printing resolution is different between the first and second printing modes.

4. The image processing method according to claim 1, wherein a third color gamut is included in both a first color gamut for which colors are reproducible by executing the first printing mode using the printing apparatus and a second color gamut for which colors are reproducible by executing the second printing mode using the printing apparatus, the first measured value and the second measured value are included in the third color gamut, the third measured value is included in the first color gamut but is not included in the third color gamut, and the fourth measured value is included in the second color gamut but is not included in the third color gamut.

5. The image processing method according to claim 1, further comprising
a printing step of printing an image on a printing medium by executing a printing mode using the printing apparatus based on the image signal color-separated in the color separating step.

6. An image processing apparatus for a printing apparatus that prints an image by executing one of a plurality of printing modes, the image processing apparatus comprising:

a color correcting unit configured to perform color correction of an input image signal to an image signal represented in a first color space by using a color profile; and a color separating unit configured to perform color separation of the image signal color-corrected by the color correcting unit into an image signal represented in a second color space different from the first color space by using a color separation table corresponding to a printing mode executed by the printing apparatus out of a plurality of color separation tables including a first color separation table corresponding to a first printing mode and a second color separation table corresponding to a second printing mode, wherein a difference between a first measured value and a second measured value is less than a predetermined value, the first measured value being acquired by measuring an image printed by executing the first printing mode using the printing apparatus based on a second image signal acquired by performing color separation of a first image signal color-corrected by the color correcting unit using the first color separation table, the second measured value being acquired by measuring an image printed by executing the second printing mode using the printing apparatus based on a third image signal acquired by performing color separation of the first image signal using the second color separation table, and wherein a difference between a third measured value and a fourth measured value is the predetermined value or more, the third measured value being acquired by measuring an image printed by executing the first printing mode using the printing apparatus based on a fifth image signal acquired by performing color separation of a fourth image signal color-corrected by the color correcting unit using the first color separation table, the fourth measured value being acquired by measuring an image printed by executing the second printing mode using the printing apparatus based on a sixth image signal acquired by performing color separation of the fourth image signal using the second color separation table.

7. The image processing apparatus according to claim 6, wherein the first, second, third, and fourth measured values are Lab values in a CIE-Lab space, and the predetermined value ΔE=1.2.

8. The image processing apparatus according to claim 6, wherein at least one of the number of relative scans between a printing head included in the printing apparatus and a unit area arranged on a printing medium, a scanning speed of the printing head, and printing resolution is different between the first and second printing modes.

9. The image processing apparatus according to claim 6, wherein a third color gamut is included in both a first color gamut for which colors are reproducible by executing the first printing mode using the printing apparatus and a second color gamut for which colors are reproducible by executing the second printing mode using the printing apparatus, the first measured value and the second measured value are included in the third color gamut, the third measured value is included in the first color gamut but is not included in the third color gamut, and the fourth measured value is included in the second color gamut but not included in the third color gamut.

10. The image processing apparatus according to claim 6, further comprising:
a printing unit configured to print an image on a printing medium by executing a printing mode using the printing apparatus based on the image signal color-separated by the color separating unit.

11. A method of generating a first color separation table corresponding to a first printing mode executable by a printing apparatus and a second color separation table corresponding to a second printing mode executable by the printing apparatus, the method comprising:
a setting step of setting a third color gamut included in both a first color gamut for which colors are reproducible by executing the first printing mode using the printing apparatus and a second color gamut for which colors are reproducible by executing the second printing mode using the printing apparatus; and
a generating step of generating the first color separation table and the second color separation table such that both a first color and a second color are included in the third color gamut, the first color being reproduced by executing the first printing mode based on a second image signal acquired by performing color separation of a first image signal using the first color separation table, the second color being reproduced by executing the second printing mode based on a third image signal acquired by performing color separation of the first image signal using the second color separation table, that a color difference between the first color and the second color is less than a predetermined value, that neither a third color nor a fourth color is included in the third color gamut, the third color being reproduced by executing the first printing mode based on a fifth image signal acquired by performing color separation of a fourth image signal other than the first image signal using the first color separation table, the fourth color being reproduced by executing the second printing mode based on a sixth image signal acquired by performing color separation of the fourth image signal using the second separation table, and that a color difference between the third color and the fourth color is the predetermined value or more.

12. The generating method according to claim 11, wherein the predetermined value ΔE=1.2.

13. The generating method according to claim 11, wherein at least one of the number of relative scans between a printing head included in the printing apparatus and a unit area arranged on a printing medium, a scanning speed of the printing head, and printing resolution is different between the first and second printing modes.

14. An image processing method for a printing apparatus that prints an image on a printing medium by executing one of a plurality of printing modes including a first printing mode and a second printing mode, the image processing method comprising:
a color correcting step of performing color correction of an input image signal to an image signal represented in a first color space by using a color profile; and
a color separating step of performing color separation of the image signal color-corrected in the color correcting step into an image signal represented in a second color space different from the first color space by using a color separation table corresponding to a printing mode executed by the printing apparatus out of a plurality of color separation tables including a first color separation table corresponding to the first printing mode and a second color separation table corresponding to the second printing mode,
wherein a first color gamut where the printing apparatus is able to reproduce colors by executing the first printing mode includes a third color gamut, and also a second color gamut where the printing apparatus is able to reproduce colors by executing the second printing mode includes the third color gamut,
wherein a first color reproduced by executing the first printing mode based on a second image signal obtained by performing a color separation of a first image signal by using the first color separation table, is included in the third color gamut, and also a second color reproduced by executing the second printing mode based on a third image signal obtained by performing a color separation of the first image signal by using the second color separation table, is included in the third color gamut, and
wherein a third color reproduced by executing the first printing mode based on a fifth image signal obtained by performing a color separation of a fourth image signal that is different from the first image signal by using the first color separation table, is included in the first color gamut but not included in the third color gamut, and also a fourth color reproduced by executing the second printing mode based on a sixth image signal obtained by performing a color separation of the fourth image signal by using the second color separation table, is included in the second color gamut but not included in the third color gamut.

15. The image processing method according to claim 14, wherein the first image signal and the forth image signal are RGB signals, and the second image signal, the third image signal, the fifth image signal and the sixth image signal are CMYK signals.

16. The image processing method according to claim 14, wherein the first color space is an RGB color space and the second color space is a CMYK color space.

17. The image processing method according to claim 14, wherein a color difference between the first color and the second color is less than a predetermined value, and a color difference between the third color and the fourth color is the predetermined value or more.

18. The image processing method according to claim 17, wherein the predetermined value in a CIE-Lab space is ΔE=1.2.

19. The image processing method according to claim 14, wherein at least one of the number of relative scans between a printing head included in the printing apparatus and a unit area arranged on the printing medium, a scanning speed of the relative scans, and printing resolution of an image to be printed is different between the first and second printing modes.

20. The image processing method according to claim 14, wherein the first color gamut includes the second color gamut.

21. The image processing method according to claim 14, further comprising:
   a printing step of printing an image on the printing medium in response to the printing apparatus executing one of the plurality of printing modes based on the color-separated image signal obtained in the color separating step.

22. The image processing method according to claim 14, wherein a color correction is performed by using a color correction table in the color correcting step, and
   wherein the color correction table corresponds to the first printing mode and the second printing mode.

23. An image processing apparatus for a printing apparatus that prints an image on a printing medium by executing one of a plurality of printing modes including a first printing mode and a second printing mode, the image processing apparatus comprising:
   a color correcting unit configured to performing color correction of an input image signal to an image signal represented in a first color space by using a color profile; and
   a color separating unit configured to perform color separation of the image signal color-corrected with the color correcting unit into an image signal represented in a second color space different from the first color space by using a color separation table corresponding to a printing mode executed by the printing apparatus out of a plurality of color separation tables including a first color separation table corresponding to the first printing mode and a second color separation table corresponding to the second printing mode,
   wherein a first color gamut where the printing apparatus is able to reproduce colors by executing the first printing mode includes a third color gamut, and also a second color gamut where the printing apparatus is able to reproduce colors by executing the second printing mode includes the third color gamut,
   wherein a first color reproduced by executing the first printing mode based on a second image signal obtained by performing a color separation of a first image signal by using the first color separation table, is included in the third color gamut, and also a second color reproduced by executing the second printing mode based on a third image signal obtained by performing a color separation of the first image signal by using the second color separation table, is included in the third color gamut, and
   wherein a third color reproduced by executing the first printing mode based on a fifth image signal obtained by performing a color separation of a fourth image signal that is different from the first image signal by using the first color separation table, is included in the first color gamut but not included in the third color gamut, and also a fourth color reproduced by executing the second printing mode based on a sixth image signal obtained by performing a color separation of the fourth image signal by using the second color separation table, is included in the second color gamut but not included in the third color gamut.

* * * * *